(12) United States Patent
Soboleski

(10) Patent No.: US 6,559,380 B2
(45) Date of Patent: May 6, 2003

(54) WEATHERPROOF COVER

(76) Inventor: Thomas Soboleski, 2884 Florida Ave., Plattsburgh, NY (US) 12901

( * ) Notice: Subject to any disclaimer, the term of this patent is extended or adjusted under 35 U.S.C. 154(b) by 0 days.

(21) Appl. No.: 09/903,544

(22) Filed: Jul. 13, 2001

(65) Prior Publication Data

US 2002/0104674 A1 Aug. 8, 2002

Related U.S. Application Data

(60) Provisional application No. 60/266,438, filed on Feb. 6, 2001.

(51) Int. Cl.[7] ................................................. H05K 5/03
(52) U.S. Cl. ............................. 174/66; 174/21; 174/22; 174/23; 174/53; 174/67; 220/3.2; 220/3.3; 220/3.8; 220/241; 220/242; 220/810; 439/138; 439/142
(58) Field of Search ............................... 174/21, 22, 23, 174/53, 66, 67; 220/3.2, 3.3, 3.8, 241, 242, 810; 439/138, 142; 206/811; D8/353; 16/277

(56) References Cited

U.S. PATENT DOCUMENTS 4,036,396 A * 7/1977 Kennedy et al. ............... 174/67
4,505,403 A * 3/1985 Bowden et al. ................ 174/67
4,979,634 A * 12/1990 Begley ............................ 16/267

* cited by examiner

Primary Examiner—Dean A. Reichard
Assistant Examiner—Anton Harris
(74) Attorney, Agent, or Firm—Krieg DeVault Lundy, LLP

(57) ABSTRACT

A weatherproof cover is provided to shield an electrical structure, such as an electrical outlet or plug, electrical switch, meter, or the like. The weatherproof cover is used to shield the electrical structure from moisture, dust, and wind. The weatherproof cover is a relatively inexpensive, easy-to-fabricate, and effective one-piece weatherproof cover which is attachable to an existing wall or other flat surface, and which is easily mountable thereon. The weatherproof cover is openable and closable to permit ready servicing or use of the electrical switch or outlet structure being covered. A spring is used to resiliently bias a top portion of the weatherproof cover to a bottom portion of the weatherproof cover. In use, bolts or screws can be inserted through openings in the bottom portion of the weatherproof cover into a wall or other surface. The bottom portion of the weatherproof cover has an aperture therethrough, which exposes the electrical structure being covered, so that when the top portion of the weatherproof cover is in an open position, the electrical structure can be used.

20 Claims, 4 Drawing Sheets

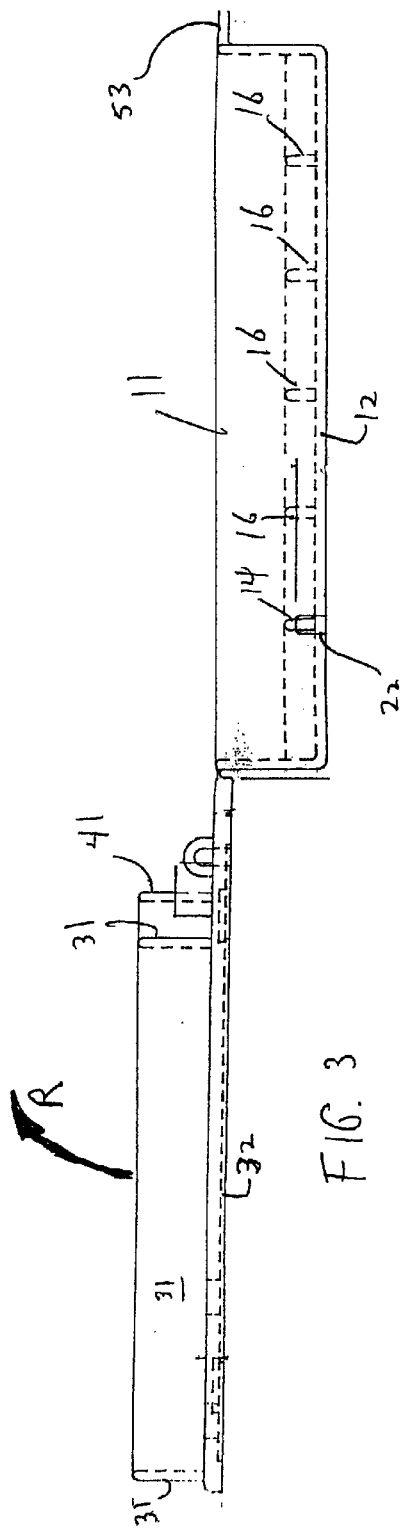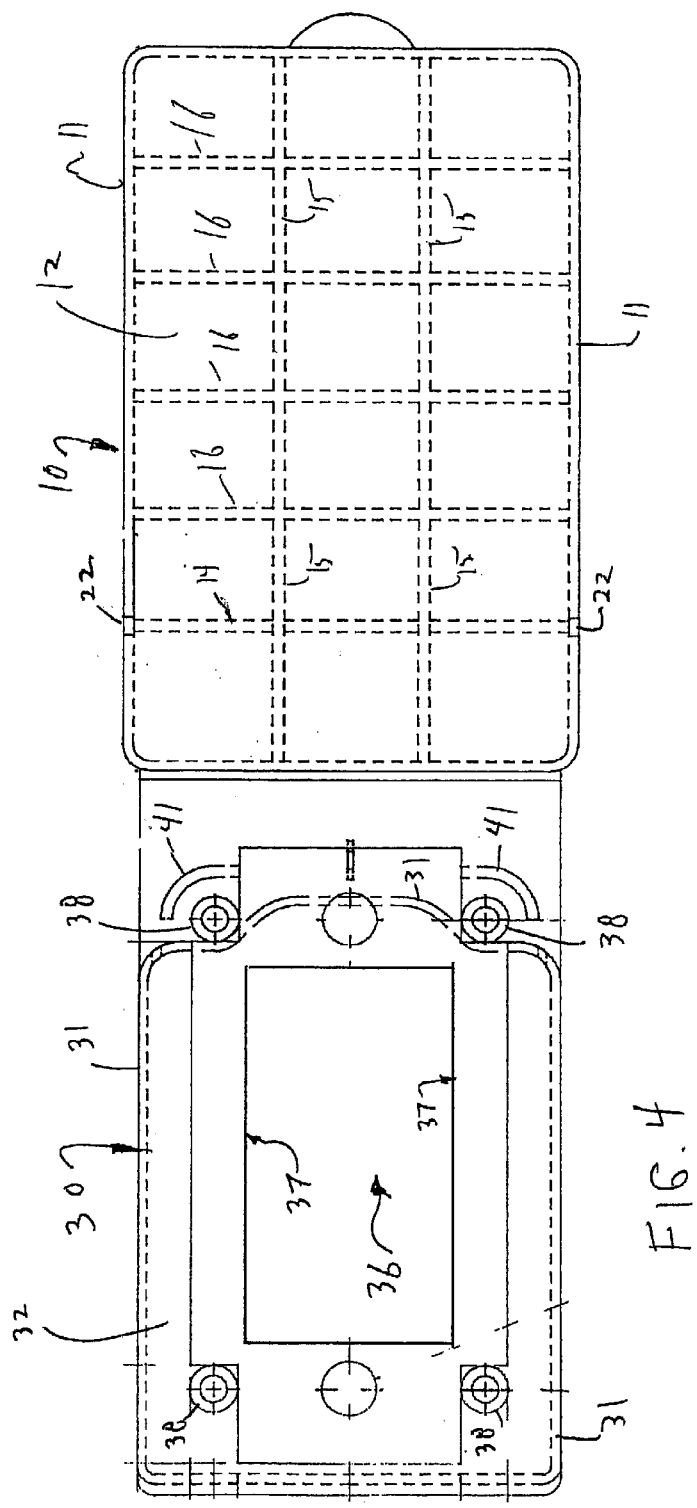

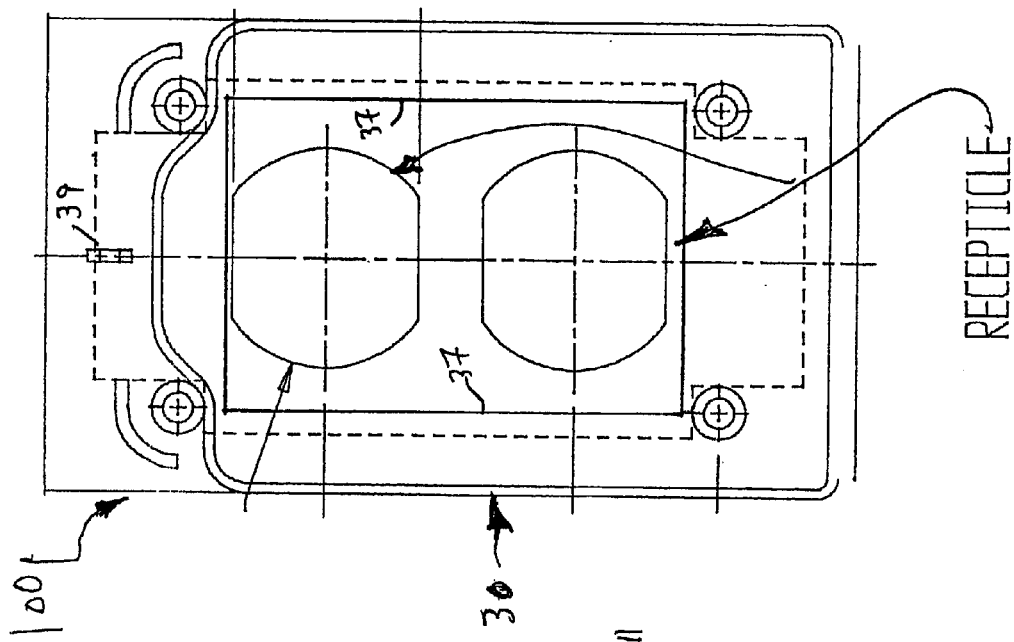
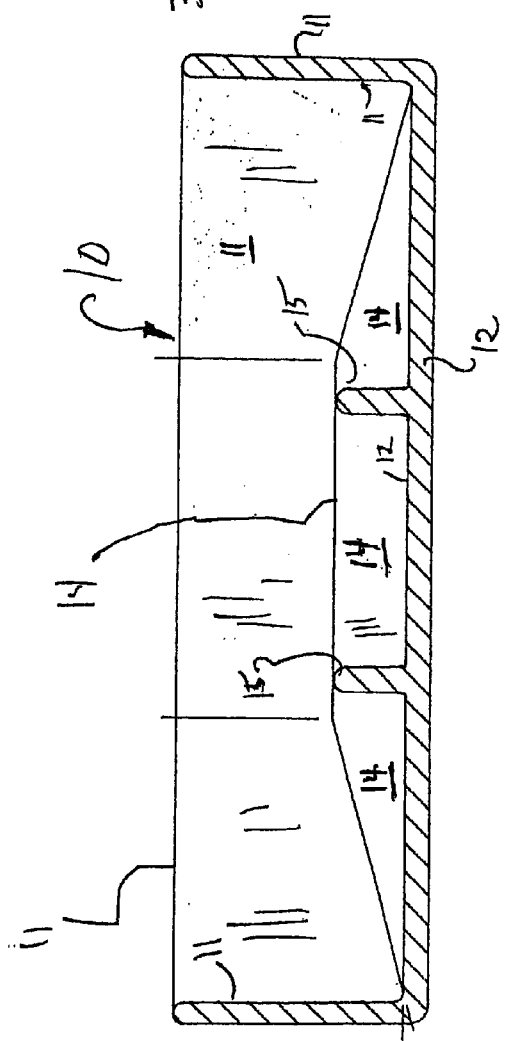

WEATHERPROOF COVER

CROSS REFERENCE TO RELATED APPLICATIONS

This patent application claims priority of provisional patent application 60/266,438 filed Feb. 6, 2001, which is incorporated by reference herein.

STATEMENT REGARDING FEDERALLY SPONSORED RESEARCH AND DEVELOPMENT

Not Applicable

INCORPORATION-BY-REFERENCE OF MATERIAL SUBMITTED ON A COMPACT DISC

Not Applicable.

BACKGROUND OF THE INVENTION

1. Field of the Invention

The present invention relates to weatherproof covers suitable for covering an electrical outlet, electrical switch, or other electrical device, or any other structure, which should be protected from the elements. More particularly, the invention relates to a weatherproof cover having two parts attached by a hinge feature.

2. Background of the Invention

There are numerous types of weatherproof covers known in the art. For example, utility meters have glass covers to shield the meter from the weather, and to protect it from moisture. Entire freestanding enclosures are also known, for example, to shield a transformer station or the like.

However, it is a problem in the art to provide a relatively inexpensive, easy-to-fabricate, and effective one-piece weatherproof cover which is attachable to an existing wall or other flat surface, and which is easily mountable thereon.

It is also a problem in the art to provide a relatively inexpensive, easy-to-fabricate, and effective on-piece weatherproof cover which is openable and closable to permit ready servicing or use of the electrical switch or outlet structure being covered.

BRIEF SUMMARY OF THE INVENTION

From the foregoing, it is seen that it is a problem in the art to provide a device meeting the above requirements. According to the present invention, a device is provided which meets the aforementioned requirements and need in the prior art. Specifically, the device according to the present invention provides a weatherproof cover which is openable and closable, and which is readily mountable upon a surface.

More specifically, the weatherproof cover according to the present invention is provided to shield an electrical structure, such as an electrical outlet or plug, electrical switch, meter, or the like. The weatherproof cover is used to shield the electrical structure from moisture, dust, and wind. The weatherproof cover is a relatively inexpensive, easy-to-fabricate, and effective one-piece weatherproof cover which is attachable to an existing wall or other surface, and which is easily mountable thereon. The weatherproof cover is openable and closable to permit ready servicing or use of the electrical switch or outlet structure being covered. A spring is used to resiliently bias a top portion of the weatherproof cover to a bottom portion of the weatherproof cover. In use, bolts or screws can be inserted through openings in the bottom portion of the weatherproof cover into a wall or other surface. The bottom portion of the weatherproof cover has as aperture therethrough, which exposes the electrical structure being covered, so that when the top portion of the weatherproof cover is in an open position, the electrical structure can be used.

Other objects and advantages of the present invention will be more readily apparent from the following detailed description when read in conjunction with the accompanying drawings.

BRIEF DESCRIPTION OF SEVERAL VIEWS OF THE DRAWINGS

FIG. 3 is a side elevational view of the weatherproof cover of FIG. 1

FIG. 4 is a top elevational view of the weatherproof cover of FIG. 1 in an open condition.

FIG. 5 is a sectional view taken along line 5—5 of the device of FIG. 1.

FIG. 6 illustrates in elevational view the bottom portion of the weatherproof cover of FIG. 1 as mounted over an electrical receptacle.

DETAILED DESCRIPTION OF THE INVENTION

Figure 1:
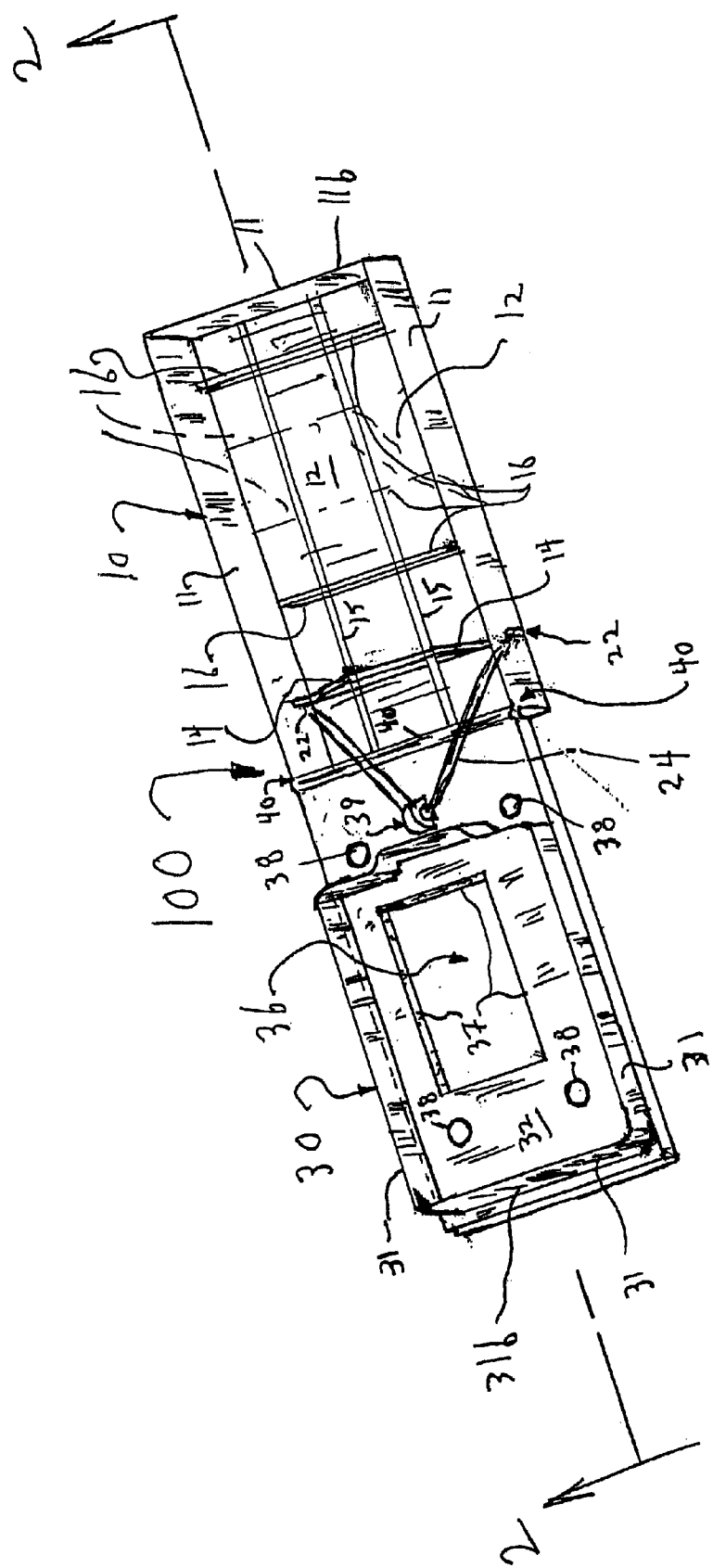
FIG. 1 is a perspective view of a weatherproof cover according to the present invention.

A weatherproof cover 100 is shown in FIG. 1 in a perspective view. The weatherproof cover 100 has a top portion 10 and a bottom portion 30. The bottom portion 30 has an aperture 37 therethrough to expose the electrical structure (not shown in FIG. 1) which is to be covered.

The top portion 10 has a front wall 12 and an upstanding side wall 11 extending about its perimeter. The bottom portion 30 has an upstanding side wall 31, which surrounds the aperture 37. The top portion 10 is movable relative to the bottom portion 30 of the weatherproof cover 100 by operation of a living hinge 40 which connects the top portion 10 to the bottom portion 30. This permits the structure shown in FIG. 1 to be placed into a folded or closed configuration, whereby the living hinge permits opening and closing of the weatherproof cover 100 to permit ready access to an electrical structure such as an electrical plug, electrical socket, electrical switch, temperature control apparatus, electrical alarm, and electrical fuse, for example. In a folded condition of the weatherproof cover 100, the upstanding side wall 31 of the bottom portion 30 fits snugly inside the upstanding side wall 11 of the top portion 10.

The top portion 10 preferably has a plurality of upstanding strengthening rids 16, and a tapered rib 14. The tapering of the rib 14 permits easy access to the apertures 22, 22. The apertures 22, 22 also extend partially into the front wall 12, as shown in FIGS. 3 and 4.

The bottom portion 30 has the upstanding side wall 31 extending from a bottom wall 32. The aperture 37 extends through the bottom wall 32. A plurality of bores 38 also extend through the bottom wall 32, to permit insertion of screws, bolts, or the like, for fastening the bottom portion 30 to a wall or other mounting surface. The bottom wall 32 also supports a loop structure 39. In use, the loop structure 39 is preferably positioned above the top of the electrical structure to be covered, so that it is generally at the top of the final mounted structure.

In the weatherproof cover 100 according to the present invention, a spring 24, shown in FIG. 1, is used to resiliently bias the top portion 10 toward the bottom portion 30. The spring 24 passes through the loop structure 39 formed in the bottom portion 30, and the spring 24 is extended so that its ends extend through respective apertures 22, 22 formed in the upstanding side wall 31. Alternatively, loop structures could be formed in the top portion 10 at the locations of the apertures 22, 22 in the upstanding side wall 31, to engage the ends of the spring 39. The spring 39 is preferably a simple coiled spring formed of spring wire, although a simple elastic band could also be used if the apertures 22, 22 are replaced by hook elements, for example. Other types of biasing means and arrangements are contemplated as being within the scope of the present invention.

The corners of the upstanding wall on the bottom portion are preferably radiused, and the corners of the upstanding wall on the top portion are also preferably radiused. The radiused coners of the bottom portion are preferably sized to fit within the radiused corners of the upstanding wall on the top portion.

In the closed condition of the weatherproof cover 100, the upstanding side wall 31 of the bottom portion 30 fits generally snugly within the upstanding wall 11 of the top portion 10. This serves as a weatherproof feature. Although moisture or water may enter through the permitted to drain out the bottom of the weatherproof cover 100. A vent hole or opening may optionally be provided at the bottom portion 11b, 31b of the upstanding walls 11 and 31, respectively.

Figure 2:
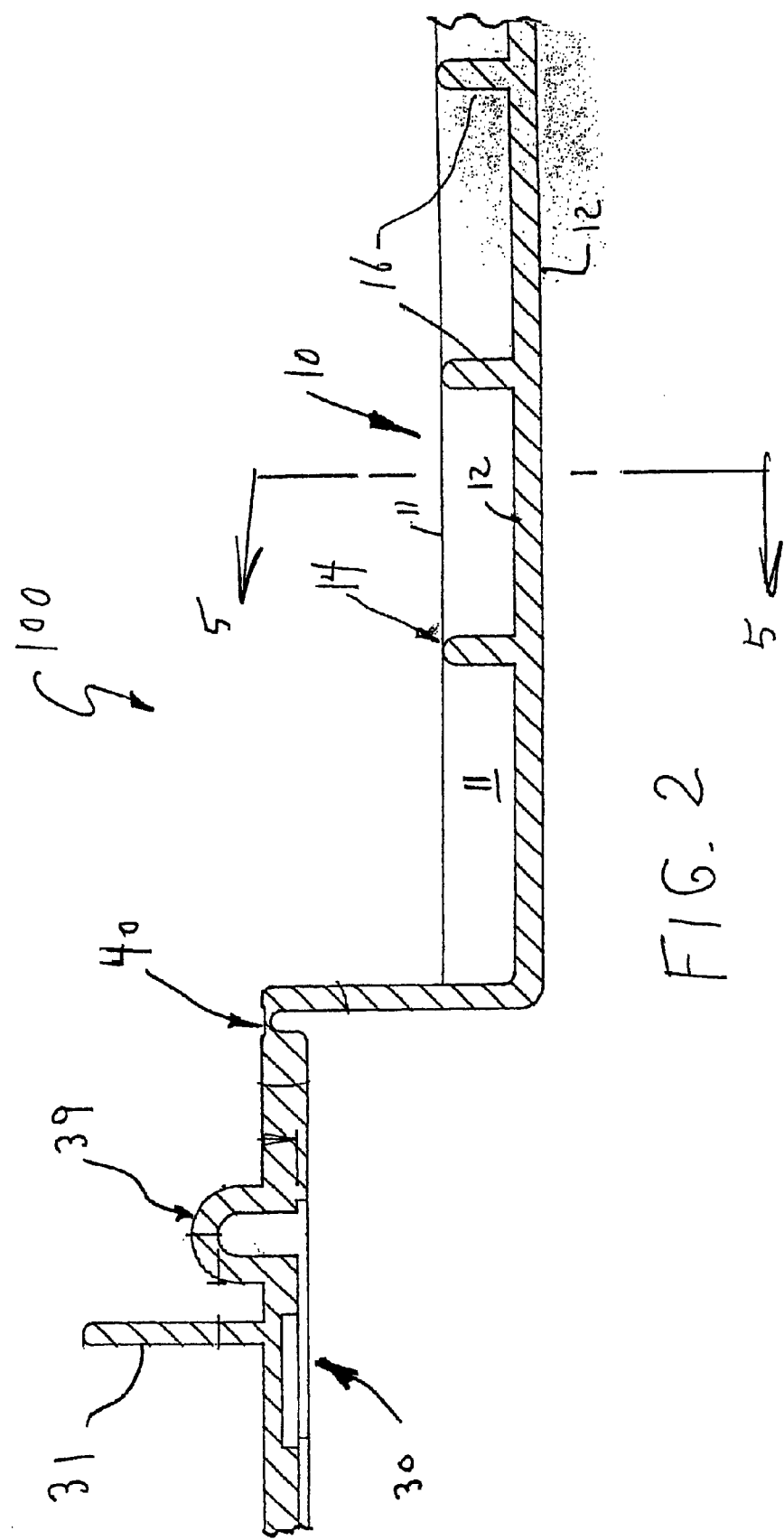
FIG. 2 is a sectional view taken along line 2—2 of the device of FIG. 1.

FIG. 2 is a sectional view taken along line 2—2 of the weatherproof cover 100 as shown in FIG. 1. In this view, the living hinge portion 40 is clearly shown as having reduced thickness. The entire weatherproof cover 100 can be molded as a single piece from a generally resilient plastic material or rubber, for example, for the sake of economy of effort and to ensure that the finished product is inexpensive. Preferably, the plastic material used to form the weatherproof cover apparatus is treated to provide ultra-violet protection, for both indoor and outdoor use.

Also shown in FIG. 2 is a cross section through the loop structure 39, and a portion of the upstanding wall 31 of the bottom portion 30. Additionally, FIG. 2 shows in section the ribs 14, 16, and the bottom wall 12 of the top portion 10.

FIG. 3 is a side elevational view of the weatherproof cover 100 of FIG. 1. It shows in dashed outline the internal structures of the weatherproof cover 100, and includes and upstanding guard rib 41. The aperture 22 through the upstanding wall 11 of the top portion 10 is also clearly shown in this figure. A tab portion 53 is shown as extending from the top end of wall 11 of the top portion 10, and is used to facilitate opening of the weatherproof cover 100 once the weatherproof cover 100 has been mounted on a wall.

FIG. 4 is a top elevational view of the weatherproof cover 100 of FIG. 1 in an open condition. This view shows the internal structures of the weatherproof cover 100, including the parallel ribs 14 and 16, and the transverse ribs 15. Also shown in dashed outline are the upstanding guard ribs 41 covering each of the top apertures 38, 38. The aperture 37, having bounding edges 36, is shown clearly in FIG. 4.

FIG. 5 is a sectional view taken along line 5—5 of the weatherproof cover 100 of FIG. 1. The ribs 15, 15 are shown clearly in section in this figure, and the tapering of the upstanding rib 14 is also clearly shown. This figure also clearly shows that the bottom wall 12 supports the upstanding side wall 11 of the top portion 10.

FIG. 6 illustrates in elevational view the bottom portion of the weatherproof cover of FIG. 1 as mounted over an electrical receptacle (unnumbered) in the form of an electrical plug or socket. The bottom portion 30 only is shown, having the aperture 37 surrounding the electrical plug. In use, the top portion 10 is rotated about the living hinge 40 in the direction shown by the arrow R in FIG. 3, so as to uncover the bottom portion 30. The spring 24 retains the top portion 10 in place against the bottom portion 30.

The invention being thus described, it will be evident that the same may be varied in many ways. Such variations are not to be regarded as a departure from the spirit and scope of the invention and all such modifications are intended to be included within the scope of the claims.

I claim:

1. A weatherproof cover apparatus, to shield an electrical structure from moisture, dust and wind, which comprises:
   d) a bottom portion sized to cover the electrical structure, the bottom portion with an aperture therethrough to expose the electrical structure through the aperture, the bottom portion further having a front wall, a rear wall, and an upstanding side wall extending from the front wall about the outer perimeter of the bottom portion;
   e) a top portion movable relative to the bottom portion by a hinge means connecting a top end of the bottom portion with a bottom end of the top portion; the top portion further having an outer wall and an inner wall, with an upstanding side wall extending from the inner wall about the outer perimeter of the top portion, the upstanding side wall sized to receive within it the upstanding wall of the bottom portion, the top portion further having a plurality of upstanding strengthening ribs and a tapered rib disposed in spaced relation between the upstanding side wall of the top portion; and
   f) a resilient biasing means extending between the tapered rib located on the top portion and a loop structure located on the bottom portion, the resilient biasing means positioned to bias the top portion from an open position into a closed position about the hinge means.

2. The weatherproof cover apparatus of claim 1, wherein at least one vent hole is provided through the upstanding side wall of each of the top and bottom portions, the vent hole positioned to drain moisture from the weatherproof cover apparatus when the weatherproof cover apparatus is in a closed position.

3. The weatherproof cover apparatus of claim 1, wherein at least one bore hole extends through the front wall of the bottom portion, the bore hole positioned for ease of mounting the weatherproof cover apparatus about an existing electrical structure.

4. The weatherproof cover apparatus of claim 1, wherein the hinge means is a flexible living hinge.

5. The weatherproof cover apparatus of claim 1, wherein the bottom portion, the hinge means and the top portion are molded as one piece from plastic material.

6. The weatherproof cover apparatus of claim 1, wherein the resilient biasing means is a coiled tension spring.

7. The weatherproof cover apparatus of claim 1, wherein the resilient biasing means is an elastic band connected to at least one loop structure positioned on the bottom portion, and at least one loop structure positioned on the top portion.

8. The weatherproof cover apparatus of claim 1, wherein the corners of the upstanding side wall on the bottom portion are radiused, and the corners of the upstanding side wall on the bottom portion are radiused to fit within the radiused corners of the upstanding wall on the top portion.

9. The weatherproof cover apparatus of claim 5, wherein the plastic material used to form the weatherproof cover apparatus is treated to provide ultra-violet protection, for use outdoors.

10. A weatherproof cover apparatus to shield an existing electrical structure from moisture, dust, and wind, which comprises:
   a) a top portion movable relative to a bottom portion by a living hinge connecting a top end of the bottom portion with a bottom end of the top portion; the top portion having an upstanding side wall, and the bottom portion having an upstanding side wall sized to be closely received within the upstanding side wall of the top portion, the top portion further having a plurality of upstanding strengthening ribs and a tapered rib disposed in spaced relation between opposing sides of the upstanding side wall of the top portion;
   b) a resilient biasing means extends between the top portion and the bottom portion, and the resilient biasing means is positioned to bias the top portion from an open position into a closed position about the hinge means; and
   c) the top portion, the living hinge and the bottom portion are molded as a single unit of plastic material.

11. The weatherproof cover apparatus of claim 10, wherein at least one vent hole is provided through a distal end of the upstanding side wall of each of the top and bottom portions, the vent hole positioned to drain moisture from the weatherproof cover apparatus when the weatherproof cover apparatus is positioned in a closed position.

12. The weatherproof cover apparatus of claim 10, wherein the resilient biasing means is a coiled tension spring.

13. The weatherproof cover apparatus of claim 10, wherein the resilient biasing means is a resilient elastic band connected to at least one hook element positioned on the bottom portion, and at least one hook element positioned on the top portion.

14. The weatherproof cover apparatus of claim 10, wherein the plastic material used to form the weatherproof cover apparatus is treated to provide ultra-violet protection, for use outdoors.

15. A weatherproof cover apparatus to shield an existing electrical structure from moisture, dust, and wind, which comprises:
   a) a bottom portion sized to cover the electrical structure, the bottom portion with an aperture therethrough to expose the electrical structure through the aperture, the bottom portion further having a front wall and an upstanding side wall extending about the perimeter of the bottom portion, at least one bore hole extends through the front wall of the bottom portion, the bore hole positioned for ease of mounting the weatherproof cover apparatus about an existing electrical structure;
   b) a top portion movable relative to the bottom portion by a living hinge connecting a top end of the bottom portion with a bottom end of the top portion; the top portion further having an upstanding side wall sized to closely receive within it the upstanding side wall of the bottom portion, the top portion further having a plurality of upstanding strengthening ribs and a tapered rib disposed in spaced relation between the opposing sides of the upstanding side wall of the top portion;
   c) a resilient biasing means extending between the top portion and the bottom portion, and positioned to bias the top portion from an open position into a closed position about the hinge means;
   d) the corners of the adjacent sides of the upstanding side wall on the top portion are radiused, and the corners of the adjacent sides of the upstanding wall on the bottom portion are radiused to fit within the radiused corners of the upstanding side wall on the top portion;
   e) the bottom portion, the hinge means and the top portion are molded as one piece from plastic material; and
   f) at least one vent hole is provided through a distal end of the upstanding side wall of each of the top and bottom portions, the vent hole positioned to drain moisture from the weatherproof cover apparatus when the weatherproof cover apparatus is positioned in a closed position.

16. The weatherproof cover apparatus of claim 15, wherein the hinge means is a flexible living hinge.

17. The weatherproof cover apparatus of claim 15, wherein the resilient biasing means is a coiled tension spring.

18. The weatherproof cover apparatus of claim 15, wherein the resilient biasing means is a resilient elastic band connected to at least one hook element positioned on the bottom portion, and at least one hook element positioned on the top portion.

19. The weatherproof cover apparatus of claim 15, wherein the plastic material used to form the weatherproof cover apparatus, is treated to provide ultra-violet protection, for use outdoors.

20. The weatherproof cover apparatus of claim 15, wherein the electrical structure comprises at least one of: an electrical plug, an electrical socket, an electrical switch, an electrical fuse; a temperature control device, and an electrical alarm.

* * * * *